US011557849B2

(12) United States Patent
Montes Gomez et al.

(10) Patent No.: US 11,557,849 B2
(45) Date of Patent: Jan. 17, 2023

(54) COVER FOR MOTOR VEHICLE ALTERNATORS

(71) Applicant: VALEO SISTEMAS ELECTRICOS, S.A. DE C.V., San Luis Potosí (MX)

(72) Inventors: Andrés Montes Gomez, San Luis Potosí (MX); Juan Carlos Loyola Salazar, San Luis Potosí (MX)

(73) Assignee: VALEO SISTEMAS ELECTRICOS, S.A. DE C.V., San Luis Potosí (MX)

( * ) Notice: Subject to any disclaimer, the term of this patent is extended or adjusted under 35 U.S.C. 154(b) by 133 days.

(21) Appl. No.: 17/052,648

(22) PCT Filed: May 3, 2019

(86) PCT No.: PCT/IB2019/053657
§ 371 (c)(1),
(2) Date: Nov. 3, 2020

(87) PCT Pub. No.: WO2019/211816
PCT Pub. Date: Nov. 7, 2019

(65) Prior Publication Data
US 2021/0184389 A1 Jun. 17, 2021

(30) Foreign Application Priority Data

May 4, 2018 (MX) .................. MX/A/2018/005649

(51) Int. Cl.
*H01R 13/50* (2006.01)
*H02K 5/22* (2006.01)
(Continued)

(52) U.S. Cl.
CPC ............. *H01R 13/50* (2013.01); *H02K 5/10* (2013.01); *H02K 5/22* (2013.01); *H02K 11/04* (2013.01); *H01R 2201/26* (2013.01)

(58) Field of Classification Search
CPC ............ H02K 5/10; H02K 5/22; H02K 5/225; H02K 11/05; H01R 13/50; H01R 13/502; H01R 2201/26
(Continued)

(56) References Cited

U.S. PATENT DOCUMENTS

| 2008/0136273 A1* | 6/2008 | Hill | ........................ | H02K 5/225 |
| | | | | 310/43 |
| 2012/0025657 A1* | 2/2012 | Shinosaka | .............. | H02K 11/05 |
| | | | | 310/159 |
| 2013/0106218 A1* | 5/2013 | Vohlgemuth | ........... | H02K 5/225 |
| | | | | 310/89 |

FOREIGN PATENT DOCUMENTS

| DE | 19605757 A1 | 8/1996 |
| DE | 19714227 A1 | 10/1998 |

(Continued)

OTHER PUBLICATIONS

International Search Report and Written Opinion in corresponding International Application No. PCT/IB2019/053657, dated Jun. 24, 2019 (12 pages).

*Primary Examiner* — Michael Andrews
(74) *Attorney, Agent, or Firm* — Osha Bergman Watanabe & Burton LLP

(57) ABSTRACT

The invention relates to a cover for protecting a regulator and a rectifier of a motor vehicle alternator, comprising at least two removable sections that are each compatible with at least two possible configurations for the connector of the regulator, and/or at least two removable sections that are each compatible with at least two possible configurations for the terminal of the rectifier, which cover can be used to protect more than one possible configuration of a motor vehicle alternator and reduces manufacturing time and costs.

10 Claims, 8 Drawing Sheets

(51) Int. Cl.
*H02K 5/10* (2006.01)
*H02K 11/04* (2016.01)

(58) Field of Classification Search
USPC .................................................. 310/40 R, 89
See application file for complete search history.

(56) References Cited

FOREIGN PATENT DOCUMENTS

| | | |
|---|---|---|
| DE | 102008054578 A1 | 6/2010 |
| FR | 2800929 A1 | 5/2001 |

* cited by examiner

US 11,557,849 B2

COVER FOR MOTOR VEHICLE ALTERNATORS

FIELD OF THE INVENTION

The present invention relates to electrical machines, more particularly to alternators for motor vehicles, and even more particularly it relates to a cover for motor vehicle alternators.

ANTECEDENTS OF THE INVENTION

Alternators are rotary electrical machines which transform mechanical energy into alternating electric current, and are mainly used to charge the batteries of vehicles whilst the engine is operating.

At present, different technologies of alternators are produced using specific components, for example heat dissipaters, stators, covers, casings, rotors, voltage regulators, etc. The covers which are used for each alternator depend on the configuration of the regulator and the heat dissipater; it is therefore necessary to develop a particular cover for each specific configuration.

When the budget is limited, developing different types of covers for each configuration of alternator is not viable, and it is therefore necessary to find a way of creating a type of cover which can be used in different configuration of alternator in order to reduce the costs.

As a consequence of this, it has been attempted to eliminate the disadvantages which the covers of alternators used at present have, by developing a cover for motor vehicle alternators which, as well as being able to be used in alternators with different configurations of the components which constitute it, such as the regulator and rectifier, make it possible to reduce the manufacturing costs and time.

OBJECTIVES OF THE INVENTION

Taking into account the deficiencies of the prior art, an objective of the present invention is to provide a cover for motor vehicle alternators which is compatible with different configurations of the components which constitute the alternator, such as the regulator and rectifier.

Another objective of the invention is to provide a cover for motor vehicle alternators which makes it possible to reduce manufacturing costs and time.

These objectives and others are achieved by means of a universal casing for an alternator according to the present invention.

BRIEF DESCRIPTION OF THE INVENTION

For this purpose, a cover has been invented to protect a regulator, which cover comprises a connector to be connected to an electrical system of a motor vehicle, and a rectifier which comprises a terminal to be connected to a battery of the vehicle itself, wherein both form part of an alternator for motor vehicles, characterised in that the cover comprises at least two sections which are compatible respectively with at least two possible configurations of the connector of the regulator; and/or at least two removable sections which are compatible respectively with at least two possible configurations of the terminal of the rectifier.

BRIEF DESCRIPTION OF THE DRAWINGS

The novel aspects which are considered to be characteristics of the present invention will be established in detail in the appended claims. However, some forms, characteristics, objectives and advantages thereof will be better understood from the detailed description, when read in relation with the appended drawings, in which:

DETAILED DESCRIPTION OF THE INVENTION

Figure 1:
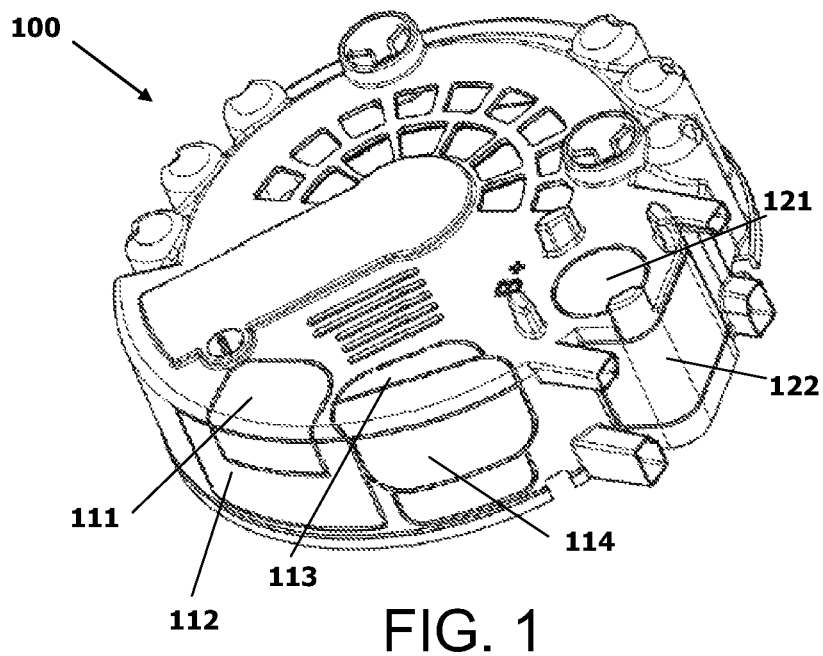
FIG. 1 illustrates a view in perspective of a specific form of a cover 100 for motor vehicle alternators according to the principles of the present invention.

It has been found that a cover for motor vehicle alternators with removable sections makes it possible to be compatible with different configurations of the components which are incorporated in the alternators, such as a regulator and rectifier, in order to reduce manufacturing costs and time, by being able to use the same cover to protect more than one possible configuration of motor vehicle alternator.

Thus, an aspect of the present invention is a cover to protect a regulator which comprises a connector to be connected to an electrical system of a motor vehicle, and a rectifier which comprises a terminal to be connected to a battery of the vehicle itself, wherein both form part of an alternator for motor vehicles, characterised in that the cover comprises at least two removable sections which are compatible respectively with at least two possible configurations of the connector of the regulator; and/or at least two removable sections which are compatible respectively with at least two possible configurations of the terminal of the rectifier.

By this means, the same cover can be used to cover more than one possible configuration of the connector of the rectifier and/or the terminal of the rectifier of the motor vehicle alternator.

The material which forms the cover can be any material that persons skilled in the art consider to be appropriate according to the specific characteristics of the alternator on which the cover will be placed. According to a preferred form of the present invention, the material of the cover can be selected from the group of polymers.

With respect to the rectifier, the terminal of the rectifier is a B+ terminal. In addition, the rectifier also comprises diodes. By this means, the rectifier is fitted on a heat dissipater which helps to cool the diodes of the rectifier. Furthermore, the heat dissipater is normally made of aluminium.

According to a preferred form of the present invention, each of the removable sections can be cut to remove part of the material of the cover, allowing the connector of the alternator and/or the terminal of the rectifier to be cleared to be connected to the electrical system of the motor vehicle and the battery of the vehicle itself respectively.

In addition, each removable section can preferably be cut independently from the other removable sections, which makes it possible to cut different combinations of removable sections to adapt the cover to the required configuration of motor vehicle alternator.

In this respect, the perimeter of each of the removable sections is preferably pre-cut, such that each section can be removed easily.

According to a preferred form of the present invention, the cover for motor vehicle alternators comprises two removable sections which are compatible respectively with two configurations of the connector of the alternator, and two removable sections which are compatible respectively with two configurations of the terminal of the rectifier.

With respect to the configurations, the two configurations of the connector of the regulator are preferably a radial configuration and an axial configuration with respect to the alternator.

Likewise, the two configurations of the terminal of the rectifier are preferably a radial configuration and an axial configuration with respect to the alternator.

According to another preferred form of the present invention, the cover for motor vehicle alternators comprises four removable sections, which are compatible respectively with four configurations of the connector of the alternator, and two removable sections which are compatible respectively with two configurations of the terminal of the rectifier.

With respect to the configurations, the four configurations of the connector of the regulator are preferably a right-radial, a left-radial, a right-axial and a left-axial configuration with respect to the body of the alternator.

Likewise, the two configurations of the terminal of the rectifier are preferably a radial configuration and an axial configuration with respect to the body of the alternator.

Thus, at least two removable sections forming at least two openings are preferably cut, which permit the connection of the connector of the regulator and the connection of the terminal of the rectifier to the electrical system of the motor vehicle and to the battery of the vehicle itself respectively.

With reference now to FIG. 1, this figure shows a view in perspective of a specific form of a cover 100 for motor vehicle alternators according to the principles of the present invention. As can be observed in this figure, the cover 100 comprises a removable section which is compatible with a left-axial configuration of a regulator connector 111, a removable section which is compatible with a left-radial configuration of a regulator connector 112, a removable section which is compatible with a right-axial configuration of a regulator connector 113, a removable section which is compatible with a right-radial configuration of a regulator connector 114, a removable section which is compatible with an axial configuration of a rectifier terminal 121, and a removable section which is compatible with a radial configuration of a rectifier terminal 122, wherein each of the perimeters of the removable sections is pre-cut in order to facilitate its removal.

Figure 2:
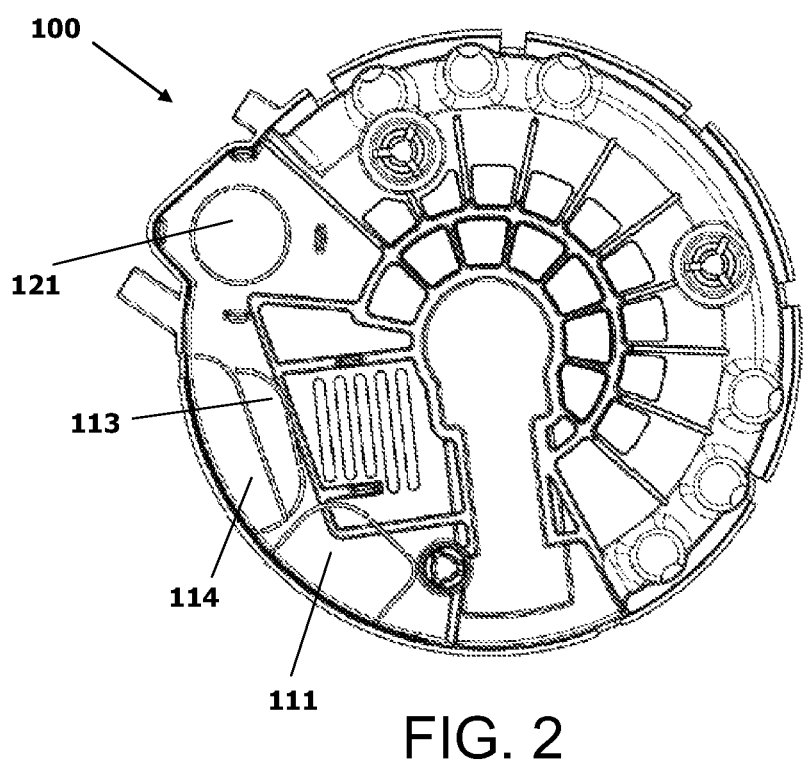
FIG. 2 illustrates a view from below of the cover 100 for motor vehicle alternators of the form shown in FIG. 1.

With reference now to FIG. 2, this figure shows a view from below of the cover 100 for motor vehicle alternators of the form shown in FIG. 1. As can be observed in this figure, the cover 100 comprises a removable section which is compatible with a left-axial configuration of a regulator connector 111, a removable section which is compatible with a right-axial configuration of a regulator connector 113, a removable section which is compatible with a right-radial configuration of a regulator connector 114, and removable section which is compatible with an axial configuration of a rectifier terminal 121, wherein each of the perimeters of the removable sections is pre-cut in order to facilitate its removal.

Figure 3:
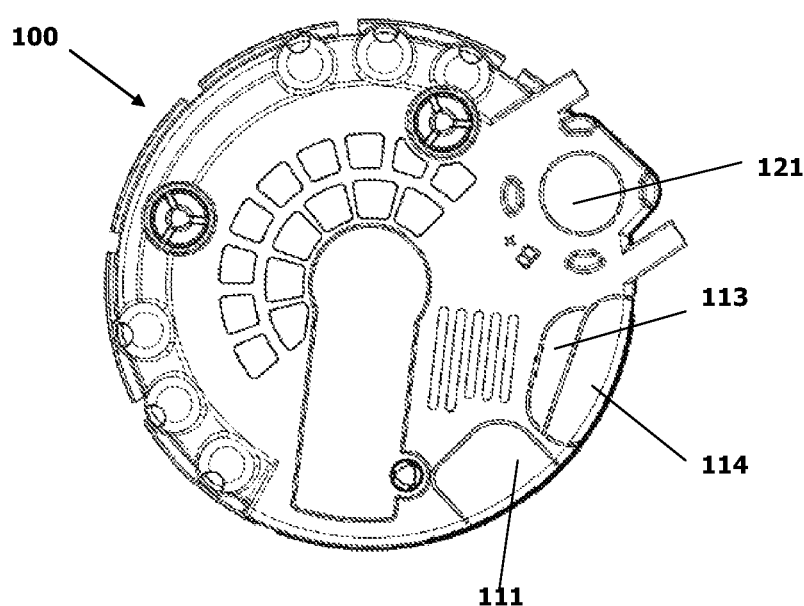
FIG. 3 illustrates a view from above of the cover 100 for motor vehicle alternators of the form shown in FIG. 1.

With reference now to FIG. 3, this figure shows a view from above of the cover 100 for motor vehicle alternators of the form shown in FIG. 1. As can be observed in this figure, the cover 100 comprises a removable section which is compatible with a left-axial configuration of a regulator connector 111, a removable section which is compatible with a right-axial configuration of a regulator connector 113, a removable section which is compatible with a right-radial configuration of a regulator connector 114, and a removable section which is compatible with an axial configuration of a rectifier terminal 121, wherein each of the perimeters of the removable sections is pre-cut in order to facilitate its removal.

Figure 4:
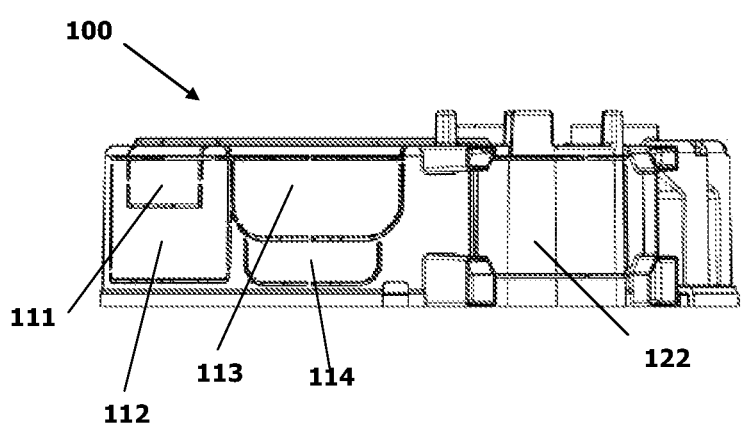
FIG. 4 illustrates a right lateral view of the cover 100 for motor vehicle alternators of the form shown in FIG. 1.

With reference now to FIG. 4, this figure shows a right lateral view of the cover 100 for motor vehicle alternators of the form shown in FIG. 1. As can be observed in this figure, the cover 100 comprises a removable section which is compatible with a left-axial configuration of a regulator connector 111, a removable section which is compatible with a left-radial configuration of a regulator connector 112, a removable section which is compatible with a right-axial configuration of a regulator connector 113, a removable section which is compatible with a right-radial configuration of a regulator connector 114, and a removable section which is compatible with a radial configuration of a rectifier terminal 122, wherein each of the perimeters of the removable sections is pre-cut in order to facilitate its removal.

Figure 5:
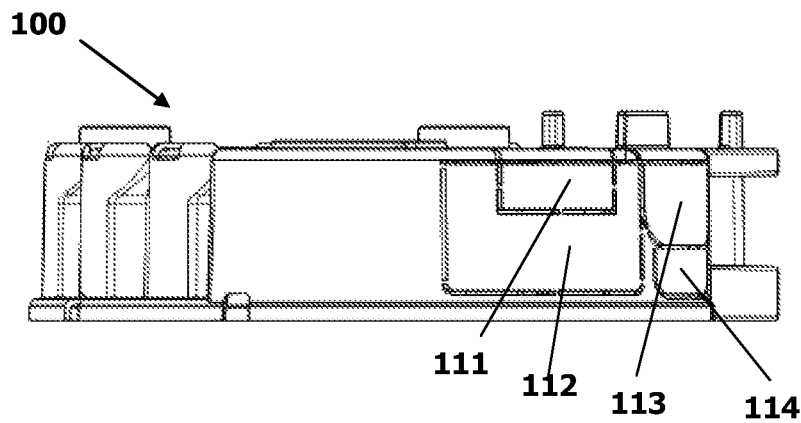
FIG. 5 illustrates a right lateral view of the cover 100 for motor vehicle alternators of the form shown in FIG. 1.

With reference now to FIG. 5, this figure shows a right lateral view of the cover 100 for motor vehicle alternators of the form shown in FIG. 1. As can be observed in this figure, the cover 100 comprises a removable section which is compatible with a left-axial configuration of a regulator connector 111, a removable section which is compatible with a left-radial configuration of a regulator connector 112, a removable section which is compatible with a right-axial configuration of a regulator connector 113, and a removable section which is compatible with a right-radial configuration of a regulator connector 114, wherein each of the perimeters of the removable sections is pre-cut in order to facilitate its removal.

Figure 6:
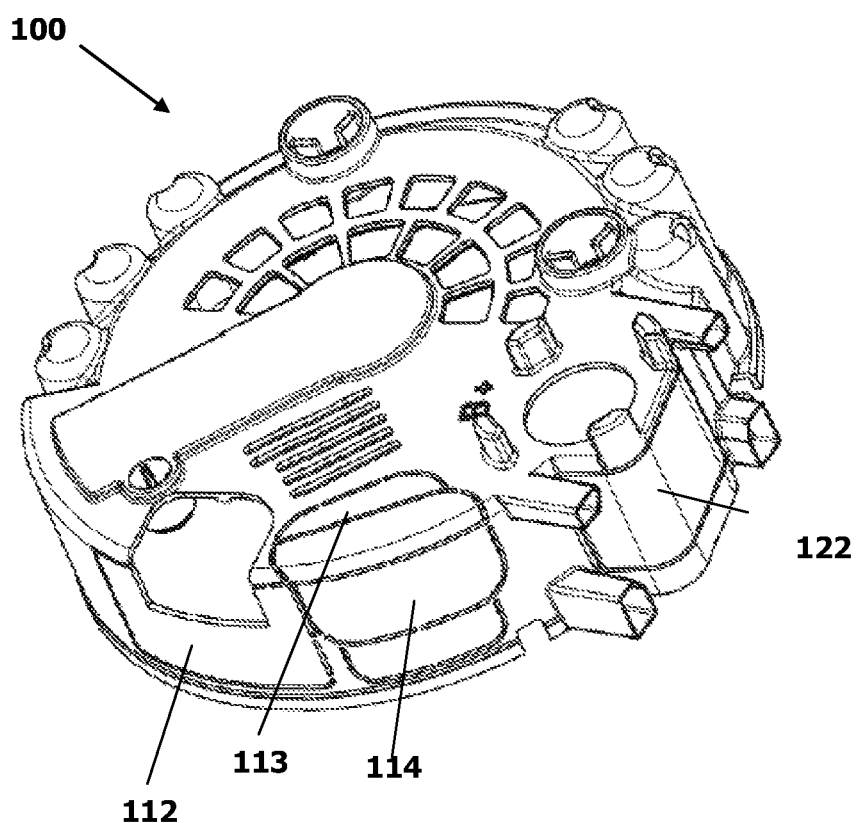
FIG. 6 shows a view in perspective of the cover 100 for motor vehicle alternators with a left axial connector opening and an axial end opening of the form shown in FIG. 1.

With reference now to FIG. 6, this figure shows a view in perspective of the cover 100 for motor vehicle alternators with a left axial connector opening and an axial end opening of the form shown in FIG. 1. As can be observed in this figure, the removable section 111 has been cut to form an opening such that a left-axial connector of the regulator 211 can remain free to be connected to an electrical system of a motor vehicle, and the removable section 121 has also been cut to form opening such that an axial terminal 221 of the rectifier can remain free to be connected to the battery of the motor vehicle itself.

Figure 7:
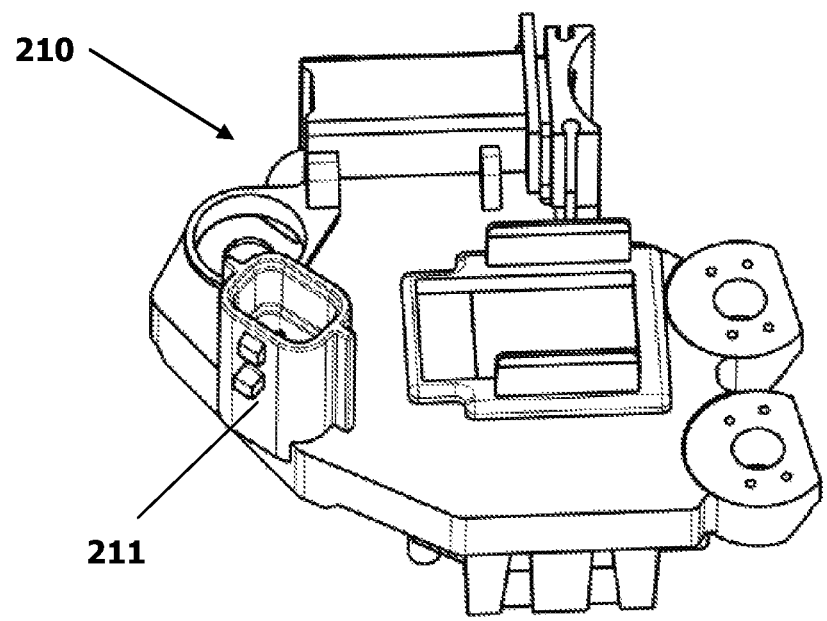
FIG. 7 illustrates a view in perspective of a specific form of a regulator 210 with a left-axial connector 211.

With reference now to FIG. 7, this figure shows a view in perspective of a specific form of a regulator 210 with a left-axial connector 211 according to the principles of the present invention. As can be observed in this figure, it will be necessary to cut the removable section 111 in order for the cover 100 of FIG. 1 to be compatible with the left-axial connector 211.

Figure 8:
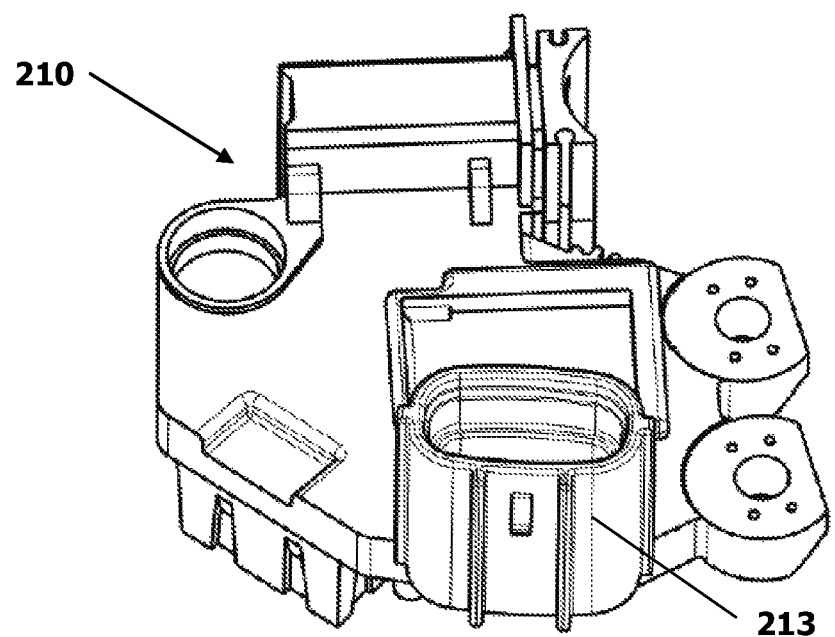
FIG. 8 illustrates a view in perspective of a specific form of a regulator 210 with a right-axial connector 213.

With reference now to FIG. 8, this figure shows a view in perspective of a specific form of a regulator 210 with a right-axial connector 213 according to the principles of the present invention. As can be observed in this figure, it will be necessary to cut the removable section 113 in order for the cover 100 of FIG. 1 to be compatible with the right-axial connector 213.

Figure 9:
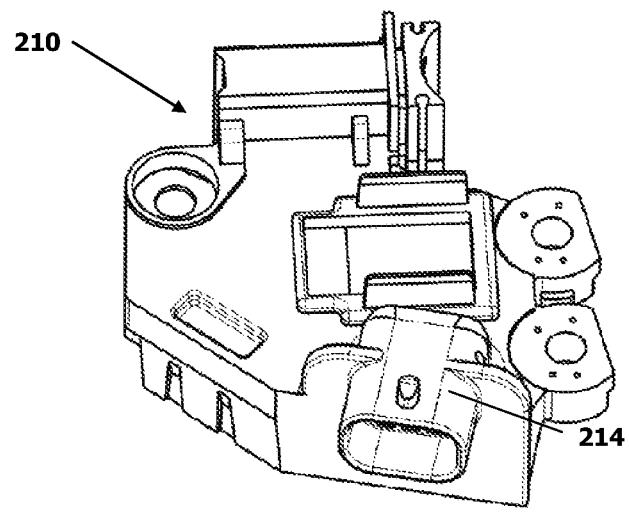
FIG. 9 illustrates a view in perspective of a specific form of a regulator 210 with a right-radial connector 214.

With reference now to FIG. 9, this figure shows a view in perspective of a specific form of a regulator 210 with a right-radial connector 214 according to the principles of the present invention. As can be observed in this figure, it will be necessary to cut the removable section 114 in order for the cover 100 of FIG. 1 to be compatible with the right-radial connector 214.

Figure 10:
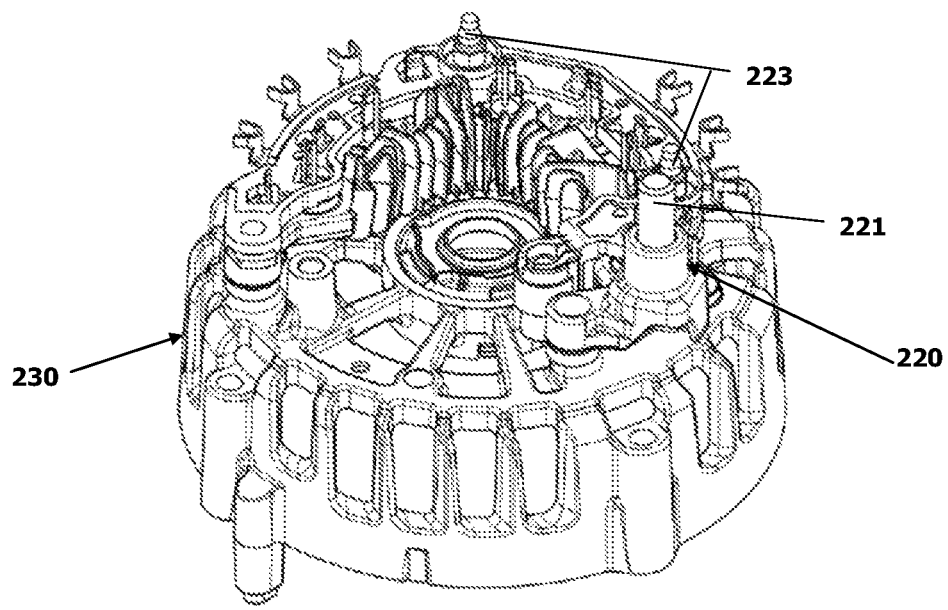
FIG. 10 illustrates a view in perspective of a specific form of a rectifier 220 with an axial terminal 221.

With reference now to FIG. 10, this figure shows a view in perspective of a specific form of a rectifier 220 with an axial terminal 221 according to the principles of the present invention. As can be observed in this figure, the rectifier 220 comprises diodes 223, and is fitted on a heat dissipater 230.

Figure 11:
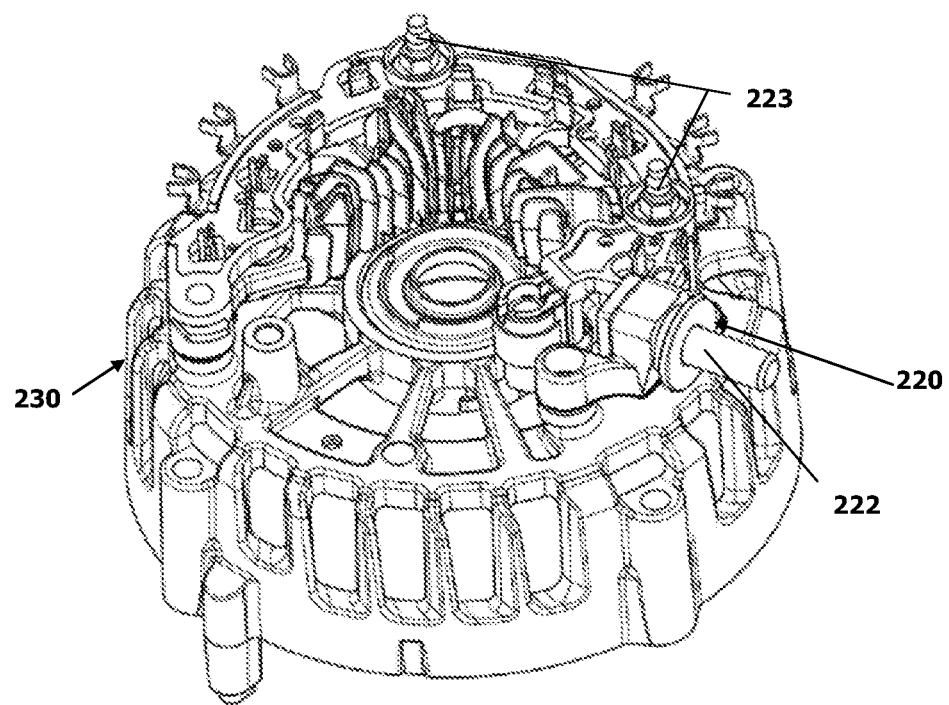
FIG. 11 illustrates a view in perspective of a specific form of a rectifier 220 with a radial terminal 222.

With reference now to FIG. 11, this figure shows a view in perspective of a specific form of a rectifier 220 with a radial terminal 222 to according to the principles of the present invention. As can be observed in this figure, the rectifier 220 comprises diodes 223, and is fitted on a heat dissipater 230.

Figure 12:
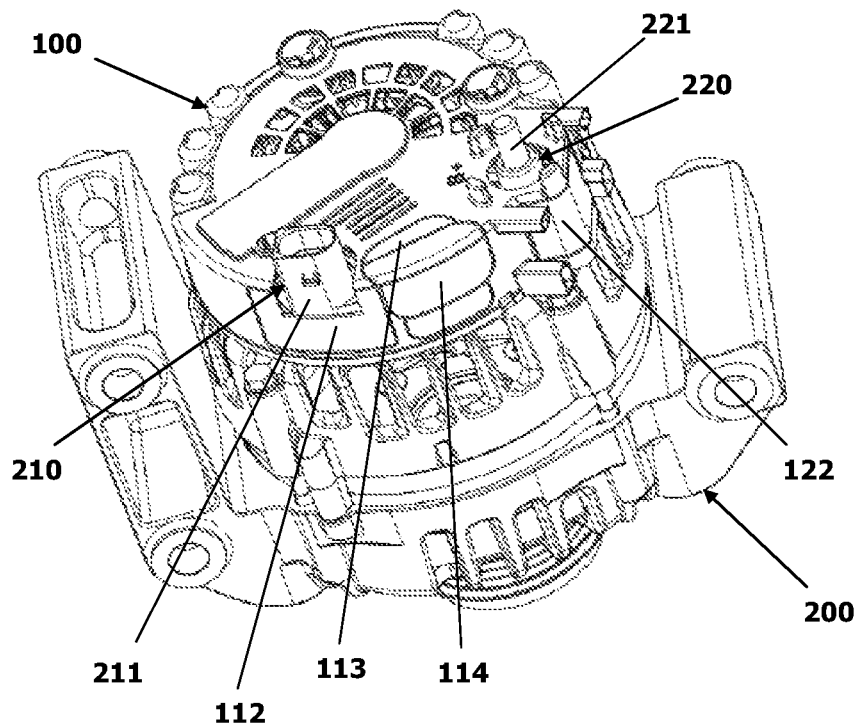
FIG. 12 illustrates a view in perspective of the cover 100 for motor vehicle alternators of the form shown in FIG. 6, fitted on a motor vehicle alternator 200 with the left-axial 211 and axial terminal 221 connector configuration according to the principles of the present invention.

With reference now to FIG. 12, this figure shows a view in perspective of the cover 100 for motor vehicle alternator of the form shown in FIG. 6, fitted on a motor vehicle alternator 200 with the left-axial 211 and axial terminal 221 connector configuration according to the principles of the present invention. As can be observed in this figure, the cover 100 is fitted on the alternator 200. For its part, the removable section 111 has been cut, and the opening formed allows the left-axial connector 211 to remain uncovered in order to be connected to an electrical system of a motor vehicle. In addition, the removable section 121 has also been cut, and the opening formed allows the axial terminal 221 to remain uncovered in order to be connected to a battery of the vehicle itself.

Figure 13:
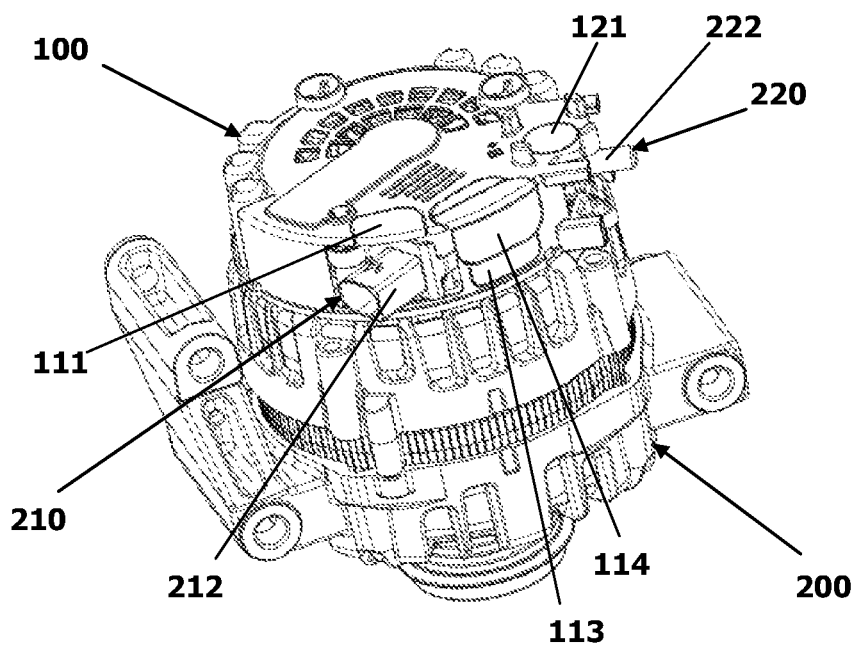
FIG. 13 illustrates a view in perspective of the cover 100 for motor vehicle alternators of the form shown in FIG. 6, fitted on a motor vehicle alternator 200 with the left-radial 212 and radial terminal 222 connector configuration according to the principles of the present invention.

With reference now to FIG. 13, this figure shows a view in perspective of the cover 100 for motor vehicle alternators of the form shown in FIG. 6, fitted on a motor vehicle alternator 200 with the left-radial 212 and radial terminal 222 connector configuration according to the principles of the present invention. As can be observed in this figure, the cover 100 is fitted on the alternator 200. For its part, the removable section 112 has been cut, and the opening formed allows the left-radial connector 212 to remain uncovered in order to be connected to an electrical system of a motor vehicle. In addition, the removable section 122 has also been cut, and the opening formed allows the radial terminal 222 to remain uncovered in order to be connected to a battery of the vehicle itself.

Figure 14:
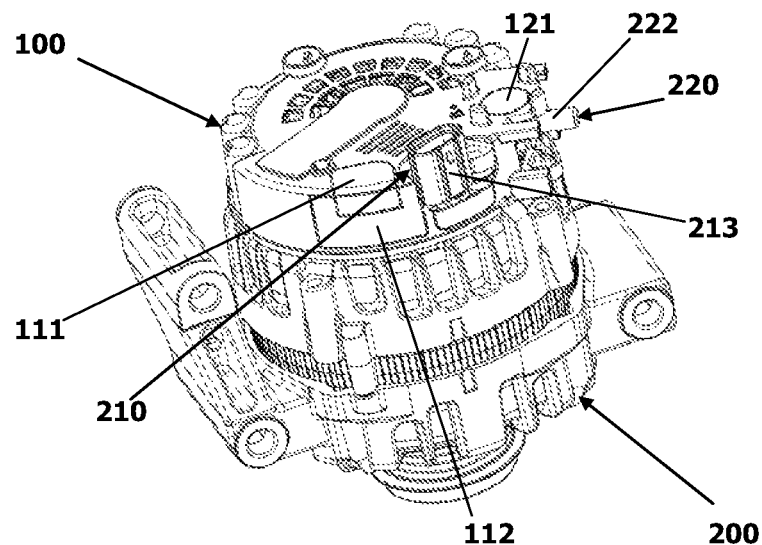
FIG. 14 illustrates a view in perspective of the cover 100 for motor vehicle alternators of the form shown in FIG. 6, fitted on a motor vehicle alternator 200 with the right-axial 213 and radial terminal 222 connector configuration according to the principles of the present invention.

With reference now to FIG. 14, this figure shows a view in perspective of the cover 100 for motor vehicle alternator of the form shown in FIG. 6, fitted on a motor vehicle alternator 200 with the right-axial 213 and radial terminal 222 connector configuration according to the principles of the present invention. As can be observed in this figure, the cover 100 is fitted on the alternator 200. For its part, the removable section 113 has been cut, and the opening formed allows the right-axial connector 213 to remain uncovered in order to be connected to an electrical system of a motor vehicle. In addition, the removable section 122 has also been cut, and the opening formed allows the radial terminal 22 to remain uncovered in order to be connected to a battery of the vehicle itself.

Figure 15:
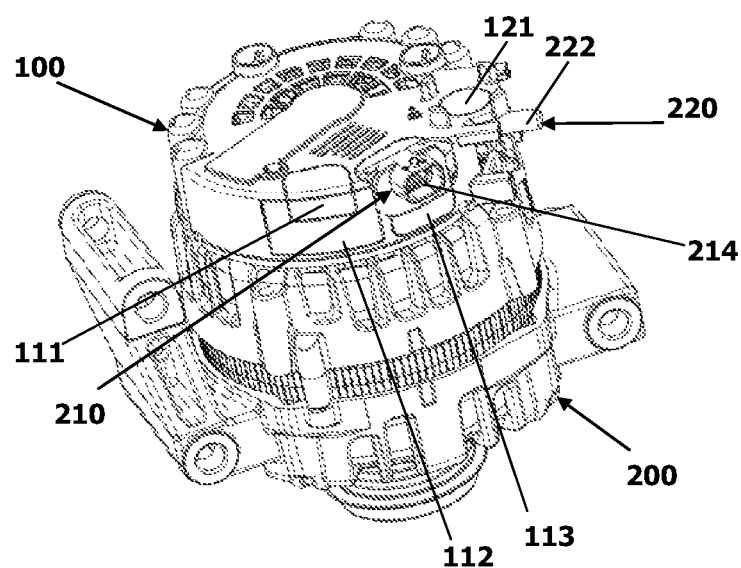
FIG. 15 illustrates a view in perspective of the cover 100 for motor vehicle alternators of the form shown in FIG. 6, fitted on a motor vehicle alternator 200 with the right-radial 214 and radial terminal 222 connector configuration according to the principles of the present invention.

With reference now to FIG. 15, this figure shows a view in perspective of the cover 100 for motor vehicle alternators of the form shown in FIG. 6, fitted on a motor vehicle alternator 200 with the right-radial 214 and radial terminal 222 connector configuration according to the principles of the present invention. As can be observed in this figure, the cover 100 is fitted on the alternator 200. For its part, the removable section 114 has been cut, and the opening formed allows the right-radial connector 214 to remain uncovered in order to be connected to an electrical system of a motor vehicle. In addition, the removable section 122 has also been cut, and the opening formed allows the radial terminal 222 to remain uncovered in order to be connected to a battery of the vehicle itself.

According to the description previously provided, it can be observed that the cover for a motor vehicle alternators has been designed to be compatible with different configurations of regulator connectors and rectifier terminals, and it will be apparent to any person skilled in the art that the forms of the cover for motor vehicle alternators as previously described and illustrated in the appended drawings are purely by way of non-limiting illustration of the present invention, since numerous changes are possible taking into consideration the details of the cover, without departing from the scope of the invention. For example, it is possible to use different types of materials, different locations for the removable sections, and different pre-cutting techniques.

Thus, the present invention should not be considered as being restricted except by the requirements of the prior art and the scope of the appended claims.

What is claimed is:

1. A cover to protect a regulator, the cover comprising:
    a connector to be connected to an electrical system of a motor vehicle;
    a rectifier which comprises a terminal to be connected to a battery of the vehicle itself,
    wherein both the connector and the rectifier form part of an alternator for motor vehicles; and
    two removable sections which are compatible respectively with two configurations of the connector, and two removable sections which are compatible respectively with two configurations of the terminal of the rectifier.

2. The cover according to claim 1, wherein each of the removable sections can be cut to remove part of the material of the cover, allowing the connector of the alternator and/or the terminal of the rectifier to be cleared to be connected to the electrical system of the motor vehicle and the battery of the vehicle itself respectively.

3. The cover according to claim 2, wherein each removable section can be cut independently from the other removable sections.

4. The cover according to claim 1, wherein the perimeter of each of the removable sections is pre-cut.

5. The cover according to claim 1, wherein the two configurations of the connector of the regulator are a radial configuration and an axial configuration with respect to the alternator.

6. The cover according to claim 1, wherein the two configurations of the terminal of the rectifier are a radial configuration and an axial configuration with respect to the alternator.

7. The cover according to claim 1, wherein the cover comprises four removable sections, which are compatible respectively with four configurations of the connector of the alternator, and two removable sections which are compatible respectively with two configurations of the terminal of the rectifier.

8. The cover according to claim 7, wherein the four configurations of the connector of the regulator are a right-radial, a left-radial, a right-axial and a left-axial configuration with respect to the body of the alternator.

9. The cover according to claim 7, wherein the two configurations of the terminal of the rectifier are a radial configuration and an axial configuration with respect to the body of the alternator.

10. The cover according to claim 1, wherein at least two removable sections forming at least two openings are cut, which permit the connection of the connector of the regulator and the connection of the terminal of the rectifier to the electrical system of the motor vehicle and to the battery of the vehicle itself respectively.

* * * * *